United States Patent [19]

Damour

[11] 3,998,560
[45] Dec. 21, 1976

[54] AUTOMATICALLY CLOSED COUPLINGS

[76] Inventor: Lawrence R. Damour, 16 Chesler Square, Succasunna, N.J. 07876

[22] Filed: Apr. 27, 1976

[21] Appl. No.: 680,674

[52] U.S. Cl. .................................. 403/26; 242/68; 279/91; 403/331; 403/351

[51] Int. Cl.² ........................................ F16D 1/12

[58] Field of Search ............... 403/331, 98, 26, 99, 403/102, 116, 100, 349, 350, 351, 353; 242/68; 279/1 B, 1 T, 91

[56] References Cited

UNITED STATES PATENTS

| 1,409,576 | 3/1922 | Reedy | 242/68 X |
| 2,427,974 | 9/1947 | Otterman | 279/1 R X |
| 2,711,861 | 6/1955 | Heygel et al. | 242/68 |
| 2,735,684 | 2/1956 | Longee et al. | 403/331 X |
| 2,901,258 | 8/1959 | Brandafi | 403/349 X |
| 3,763,732 | 10/1973 | Stursberg | 279/91 X |

FOREIGN PATENTS OR APPLICATIONS

| 1,288,219 | 9/1972 | United Kingdom | 242/68 |
| 1,306,215 | 2/1973 | United Kingdom | 403/331 |

Primary Examiner—Wayne L. Shedd
Attorney, Agent, or Firm—Ralph R. Roberts

[57] ABSTRACT

This invention pertains to an automatically-closing coupling which is adaptable to permit either roundended or square-ended shafts to be laterally inserted thereinto. Pedestals, including anti-function bearing rotatably support driving and driven spindles. Lateral slots are provided in the pedestals, in intermediate locking sleeves and in the spindles into which the ends of a shaft are freely received when the slots are all rotated into alignment and held by a detent means. After the shaft is inserted, a quarter turn of the spindle causes relative rotation between the spindles and the sleeves, locks the shaft in the spindles and releases the detent means, thus allowing free rotation of the shaft and spindles relative to the pedestals.

12 Claims, 18 Drawing Figures

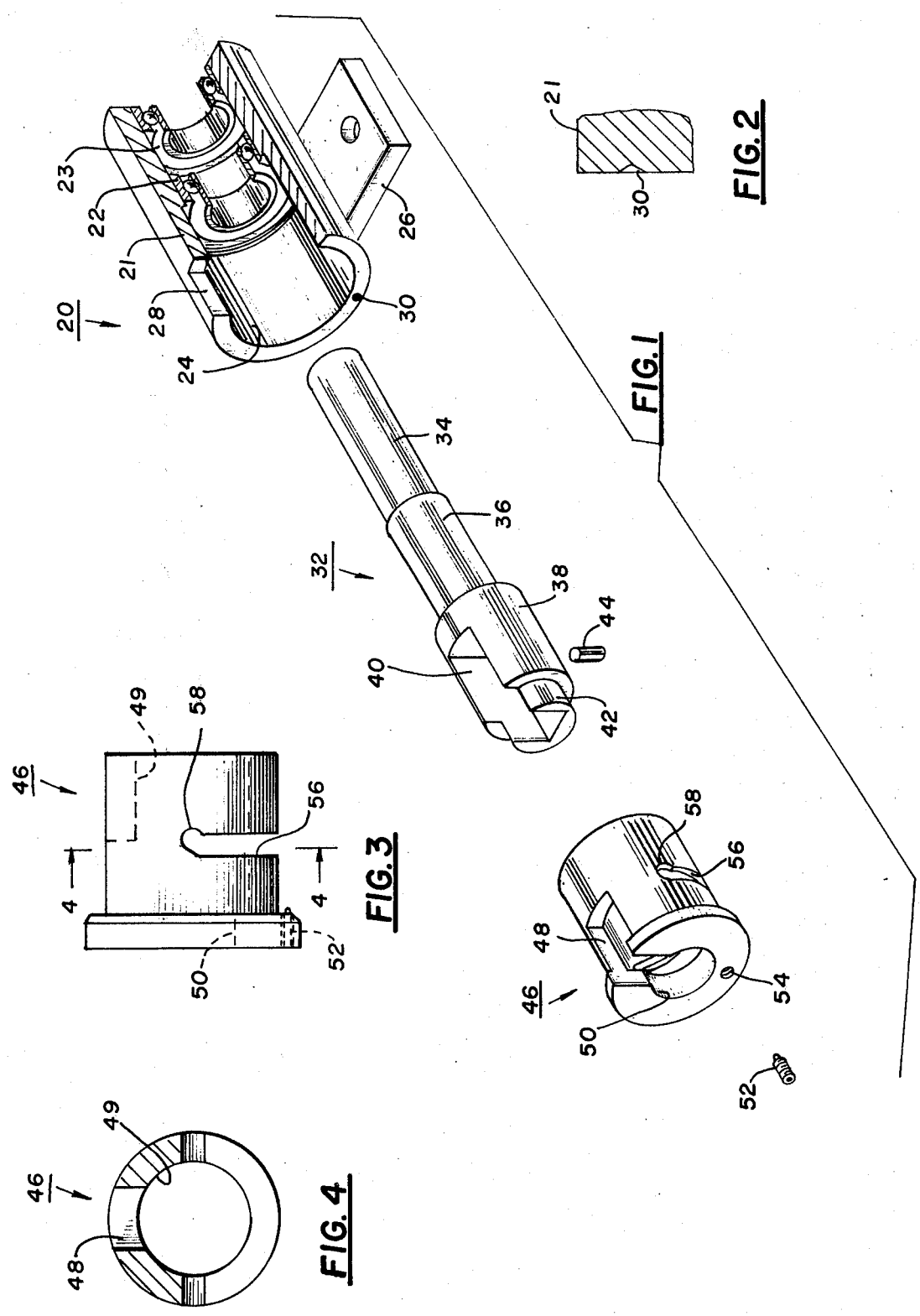

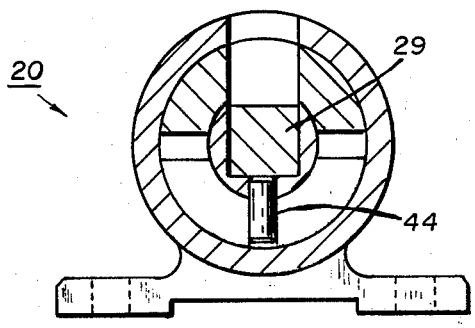
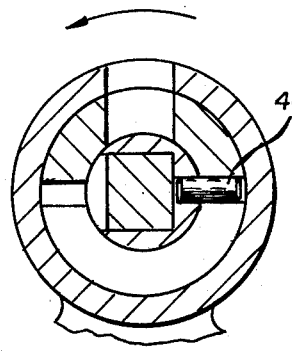
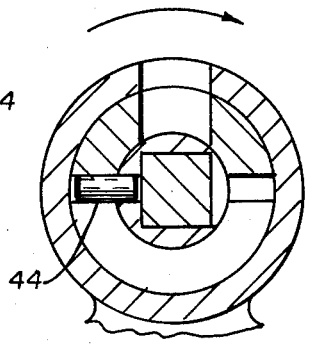
FIG. 6    FIG. 7    FIG. 8
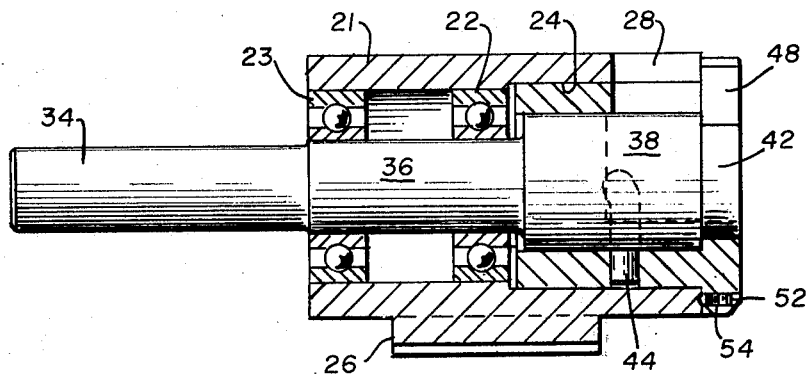
FIG. 5
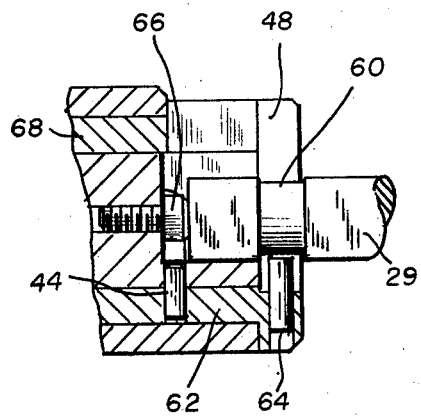
FIG. 10
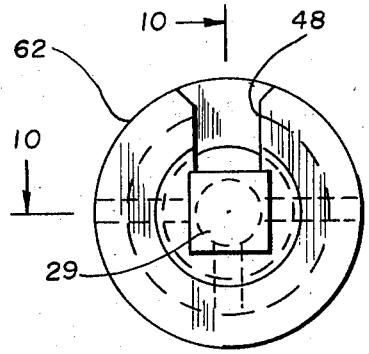
FIG. 9

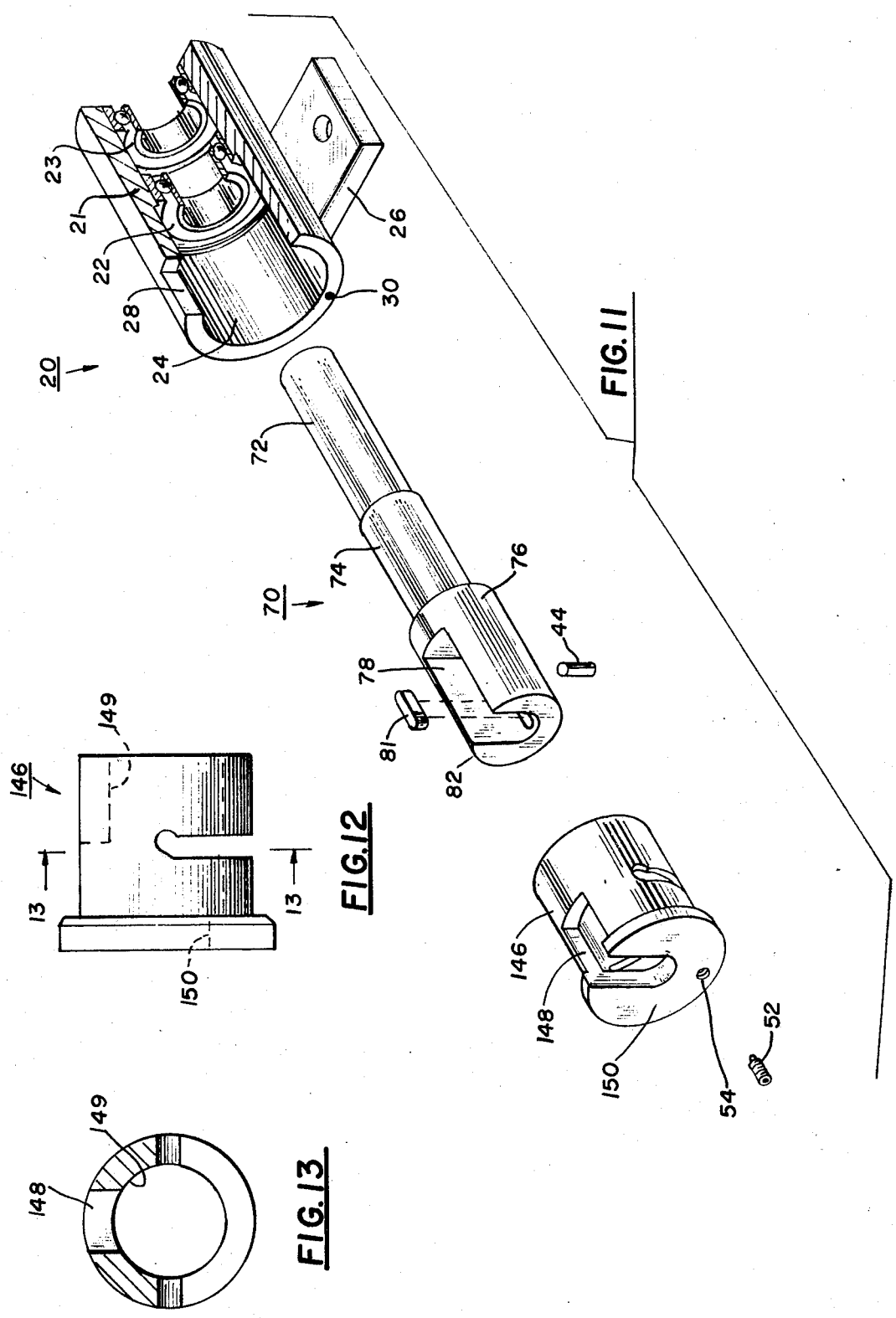

AUTOMATICALLY CLOSED COUPLINGS

BACKGROUND OF THE INVENTION

1. Field of the Invention

With reference to the classification of art as established in the United States Patent and Trademark Office the present application is believed to be in the art generally identified as "Joints and Connections" (Class 403) and in the subclasses therein entitled, "Interfitted members — bayonet joint" (subclass 349) and in the subclass of "rotary binding cam or wedge" (subclass 350) and the further subclass "arcuate slip" (subclass 352) and "assembled by plural manipulation of member" (subclass 353).

2. Description of the Prior Art

Square jaw and round shaft couplings are well known and particularly with the use of film, paper and coated products in rolls. The rapid and accurate transfer of rolls of strip material from driver and take-up strands is necessary and has been the subject of many designs and patents. Usually the coupling is a part of a take-up or a pay-off stand in which a spindle is carried in antifriction bearings and by a pin or sliding collar the shaft in the roll is secured in the coupling. Insofar as is known, couplings allowing simple drop in mounting of the shaft require manual manipulation of a closing device before the roll can be rotated in operation. This often results in a start up of apparatus before the closing of the coupling or securing of the shaft in the coupling. This may be due to inattention, carelessness or malfunction of the coupling means. When a roll is dropped from a coupling there is often damage to the roll if not the stand equipment as well.

The prior known couplings are of a complex construction if the coupling is to be secured to the shaft carrying the roll. If the coupling is generally a slip collar construction it may or may not be retained in place by a detent. In any event positive closing of the coupling is dependent upon the operation and the condition of the equipment. Insofar as is known, the present invention is the only known coupling which provides a means for placing the shaft upon which the roll is mounted to be wound or unwound into the coupling and as the roll is rotated the rotation of the shaft, whether in a clockwise or in a counterclockwise direction, closes the coupling with a quarter turn. The shaft is thus securely captured in position during the remainder of the operation. A manual manipulation is required to open the coupling with the U-shaped opening in the "up" position before the shaft may be removed from the coupling. This positive orientation of the shaft and the automatic closing of the coupling insures that the shaft will not drop from the coupling during its operational sequence.

SUMMARY OF THE INVENTION

This invention may be summarized at least in part with reference to its objects.

It is an object of this invention to provide, and it does provide, for an automatically closed coupling with a U-shaped receiver particularly adapted for either a round or a square shaft. This coupling is automatically closed with a quarter turn of the seated shaft in either direction and once the coupling is closed the shaft is retained in a closed position until deliberate manual manipulation opens the coupling at which time the shaft must be lifted directly upward for removal and to free itself from the coupling.

It is a further object of this invention to provide, and it does provide, a simple automatically closed coupling in which an outer collar has a cam track formed therein and at each end of this cam track is a forwardly acting cam portion which is engaged by a pin carried by a rotating spindle of the coupling. This pin as it moves in the cam track as the spindle is rotated causes the collar member of the coupling, as the pin reaches the end of the track, to be moved forward to remove the rotational inhibiting effect of a friction retaining means. The forward movement of the collar frees the friction stop cooperatively carried by the coupling collar and a pedestal member. With the collar in a forward position the coupling may then be rotated freely in anti-friction bearings in and by which the spindle is supported.

In brief, the coupling of this invention includes a pedestal member in which antifriction bearings are provided and in a forward opening portion of this pedestal housing portion is formed an opening into which an end of a roll shaft is permitted to enter the coupling. In the antifriction bearings mounted in this pedestal is carried a spindle in which is formed a U-shaped groove. This groove is slidably adapted to either retain a square shaft or in another configuration a round shaft having a keyway therein. On the foreportion of this spindle is carried a collar member in which is formed a cam slot with each end of this cam slot having a forward directing cam portion. A pin carried on the spindle is slidable in this cam slot and when it reaches the end of this cam slot the pin urges the collar member forwardly. This collar member is retained in a desired orientation with the opening for the roll shaft in a vertical position by means of a spring detent. This detent is disengaged as and when the pin carried by the spindle reaches the end of the cam slot to urge the collar forwardly. To remove the roll shaft the spindle and collar must be brought to an orientation whereby the U-slot in the spindle is open to the top of the pedestal member. By manual manipulation the opening in the collar member is brought into an alignment whereby the slot in the collar and pedestal member is vertically aligned enabling the lifting of the roll shaft from the coupling.

In addition to the above summary the following disclosure is detailed to insure adequacy and aid in understanding of the invention. This disclosure, however, is not intended to cover all inventive concepts. For this reason there has been chosen a specific embodiment of the automatically closed coupling as adopted for use with round and square couplings and showing a preferred construction for powered and free running couplings. This specific embodiment and alternate embodiments thereof have been chosen for the purposes of illustration and description as shown in the accompanying drawings wherein:

BRIEF DESCRIPTION OF THE DRAWINGS

FIG. 1 represents an expanded, isometric view of the coupling of this invention and as shown the driver end and the shaft to be secured and supported in the coupling is a square shaft;

FIG. 2 represents a fragmentary, sectional view showing a spot recess formed on the end of the pedestal housing and the seating therein of an end of a spring detent as carried by the collar member;

FIG. 3 represents a side view in enlarged scale of the collar member of this coupling and showing in particular the preferred configuration of the cam slot;

FIG. 4 represents a sectional view taken on the line 4—4 of FIG. 3 and looking in the direction of the arrows;

FIG. 5 shows a side view, partly in section, of the assembled coupling of FIG. 1 and including a spindle with a drive end;

FIG. 6 represents a sectional view showing the relationship of the three essential components forming this coupling with the receiver configured to retain and release a square shaft;

FIG. 7 represents a sectional view of FIG. 6 with a square shaft mounted in the coupling and the coupling turned one-quarter turn counterclockwise;

FIG. 8 represents the view of FIG. 7 with a square shaft mounted in the coupling and the coupling turned one-quarter turn clockwise;

FIG. 9 represents a partly diagrammatic view showing the construction of a coupling in which the coupling is carried on slides to enter the roll and shaft;

FIG. 10 represents a view taken on the line 10—10 of FIG. 9 and showing the construction of the coupling for a square shaft and with the coupling roller carrying pins which enter a groove in a square shaft to position this shaft in the coupling whether the coupling is a powered or a free coupling in a stand or pay-off;

FIG. 11 represents an expanded isometric view similar to that of FIG. 1 and showing the coupling receiver portion configured for the receipt of and retention of a round shaft;

FIG. 12 represents a view similar to that of FIG. 3 and showing a collar as used with a coupling for a round shaft;

FIG. 13 shows a sectional view on the line 13—13 of FIG. 12 and looking in the direction of the arrows;

In the following description and in the claims various details are identified by specific names for covenience, such names, however, are intended to be generic in their application. Corresponding reference characters refer to like members throughout the several figures of the drawings.

Figure 15:
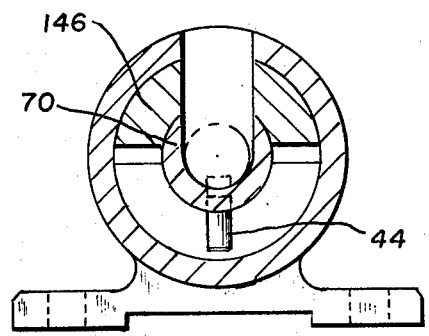
FIG. 15 represents a sectional view showing the assembled relationship of several components making up the round shaft drive coupling.

The drawings accompanying, and forming part of, this specification disclose certain details of construction for the purpose of explanation of the broader aspects of the invention, but it should be understood that these details may be modified without departure from the concept of the invention.

DESCRIPTION OF THE SQUARE JAW COUPLING OF FIGS. 1 THROUGH 10

Referring now in particular to the drawings and to FIGS. 1 through 10, it is to be noted the coupling is provided with a pedestal 20 including a tubular body 21 in which there is mounted a pair of antifriction ball bearings 22 and 23. These bearings are a press fit in a reduced bore in the pedestal tubular body 21 and may be retained in spaced relationship by a spacer, not shown. An enlarged diameter 24 is formed in the front portion of this pedestal body. Opposite the base portion 26 of the pedestal is a slot or opening 28 through which is passed the end of a square shaft 29, to be hereinafter more fully described. Opposite this slot 28 is a shallow dimple or tapered countersink 30, shown in an enlarged view in FIG. 2, and placed at the bottom of the front face of the tubular body 21, seen in FIG. 1. Rotatably carried by the bearings 22 and 23 is an axle generally indicated as 32. As depicted in FIG. 1, this axle or shaft has three diameters. The right and reduced end diameter 34 extends beyond the housing and is intended to receive the drive pulley pinion or sprocket. On this extension is mounted the driven member by which this powered coupling is driven. A slightly larger diameter 36, as seen in FIG. 5, is a light press fit for the inner races of the bearings 22 and 23. These bearings are pressed in place and are selected for whatever the speed and load desired or required. The enlarged, left end 38 of the axle 32, as depicted, has a rectangular U-shaped slot 40 for the retaining therein of a square shaft 29, to be hereinafter more fully described. The foreportion of this axle 32 is a reduced diameter at 42 to provide a retaining and rearward stop shoulder for a collar member, to be hereinafter more fully described.

Carried in the bottom of this enlarged, left end portion 38 is a drive pin 44 which, as seen in FIG. 5, may be driven in place from the top at the time of assembly with access from the slot 40. This mounting occurs after a collar member has been mounted on the foreportion 38 of the axle 32. This collar member is generally indicated as 46. In this collar member is formed a slot 48 sized to slidably pass square shaft 29. At the far end of this collar member 46 is a circular recess 48. Through passageway 49 is a sliding fit on the reduced diameter 42. A circular, reduced diameter passageway 50 extends from this slot 48. Carried in the front portion of this collar member 46 is a spring detent 52 which is adjustably mounted in a threaded aperture 54 formed in the front flange or shoulder portion of the collar 46. In the side of the collar 46 a cam slot 56 is formed and at each of the ends of this slot 56 is formed a forwardly displacing cam portion 58. Slot 56 and the forwardly displacing cam portion 58 are sized so as to be a sliding fit on the pin 44.

ASSEMBLY OF THE SQUARE SHAFT COUPLING OF FIGS. 1 AND 5

Referring particularly to FIG. 5, it is to be noted that with the bearings 22 and 23 positioned in place in the pedestal 20 the axle 32 is mounted in position for free rotation in these bearings. Where and when a spacer between the bearings 22 and 23 is required or desired is merely a matter of choice or selection. On the extending, reduced portion 34 there is mounted a drive means for rotating the shaft which is not shown. The collar member 46 is slid into place after the axle 32 has been mounted in the bearings in the pedestal. This collar member is movable back and forth along the extending foreportions 38 and 42 of the axle 32. Through the slot 56, pin 44 is mounted in a hole (FIG. 5) formed in the enlarged portion 38 of the axle 32. A portion of pin 44 extends into the cam slot 56 to retain the collar member 46 on the axle 32 in the desired forward position dictated by the position of the cam slot 56 in the collar member 46. The spring detent 52 is then mounted so that it enters the dimple 30 when the pin 44 is midway between the forward moving cam end portions 58. When the pin moves into the forwardly directing cam end 58 it displaces this collar member 46 sufficiently forwardly so that the engaging end portion of spring plunger 52 is moved out of the shallow dimple 30 to permit the axle to become free turning.

Assuming a square shaft 29 is to be dropped into the slot 40 of the axle 32 this can only be accomplished with an alignment of the several slots is made as in FIG. 6. When this alignment is accomplished and the square shaft is dropped into position then the coupling is ready for automatic closing. A quarter turn either clockwise or counterclockwise causes the shaft to be trapped and become free turning. As seen in FIG. 7, with a quarter turn to the right the slot portion of the collar member still remains in the originally placed position with the slot 48 in the vertical condition until the shaft 29 has rotated one-quarter turn. The diameter portion 50 engages and traps the edges of the shaft in slot 48. When and as the pin 44 moves into the cam recess slot 58 the collar member 46 is carried or moved forwardly sufficiently for the collar member to move the end of the spring detent 52 from restraining engagement in the dimple 30 whereupon the shaft becomes free turning. When the direction of rotation is counterclockwise then reference is made to FIG. 8 which shows the condition of the coupling after a quarter turn counterclockwise of shaft 29 has been made.

FREE TURNING COUPLING OF FIGS. 9 AND 10

Referring next to FIGS. 9 and 10, it is to be noted that in addition to a driven end coupling there is also required a free turning coupling to carry the other end of the driven shaft. In addition there is also the pay-off stand which utilizes two couplings that are not powered for the period of time the web or like material is being delivered from the roll. The non-powered coupling is very like the powered end coupling except that the drive extension 34 on the axle 32 is removed. The end of the square shaft 29 may be configured for special removable retention in the free turning coupling.

This special configuration is accomplished by forming on one end of the square shaft 29 a reduced diameter groove 60. In addition to this groove there is mounted in an altered collar member 62 a pair of retaining pins 64 which fit into groove 60 to prevent the shaft from moving lengthwise. In addition to these pins a cap screw 66 is mounted in a threaded hole in the end of the altered axle which absent the extending end is identified as 68. Screw 66 is adjusted so as to accommodate unwanted end play in the square shaft.

In the manner of FIG. 5, when the square shaft 29 is dropped into the free turning coupling a quarter revolution the shaft turns the pin 44 until it engages the cam end 58 in slot 56. The collar member 62 is restrained from turning by spring detent 52 until the collar has been cammed forwardly. In a disengaged condition and the pin 44 in the cam end 58, a free rotation of the axle 68 is able to occur. The retaining groove on the shaft 29 permits quite a little play on the other end of the shaft whether free or driven. When desired both ends of the shaft may have grooves 60.

ASSEMBLY AND USE OF THE FREE RUNNING COUPLING OF FIGS. 9 AND 10

In the manner of the driven end coupling, above-described, the free or non-powered coupling is assembled and used as the powered end except that a power drive to the axle is absent. Whether the groove 60 and pin 64 are used is merely a matter of preference since they may be omitted if desired. In every other respect, except for the connection to the power source, the use and assembly of the free end coupling is the same as for the powered coupling end.

DESCRIPTION OF THE EMBODIMENTS OF FIGS. 11 THRU 17

Referring now and next to the drawings and to FIGS. 11 through 17 there is shown an alternate embodiment of the automatic closing coupling, above-described. Instead of a square shaft the embodiments to be described hereinafter are for a round shaft. As seen in FIG. 11, the exploded view is very similar to the view of FIG. 1. Shown in FIG. 11 is a pedestal 20 which is identical to, or substantially identical to, the pedestal seen in FIG. 1. Carried in the outer cylinder portion 21 are bearings 22 and 23. To the left of these bearings is the enlarged portion 24 and the support portion 26. As shown, the pedestal 20 is identical to the pedestal shown in FIG. 1. Slot 28 instead of being sized to accept a square shaft 29 is sized to accept a round shaft, to be hereinafter more fully described. A shallow dimple 30 is formed in the front edge of the housing 21, as seen in FIGS. 1 and 2. A spindle or axle 70 is very similar to the spindle 32, as seen in FIG. 1.

As seen in FIG. 11, this spindle has a reduced diameter 72 upon which may be mounted a gear, sprocket or pulley depending upon the desired means of driving this spindle. A larger portion 74 of the axle 70 is a snug fit in the bearings 22 and 23 carried in the pedestal 20. An enlarged portion 76 of the spindle is carried in the foreportion 24 of the pedestal. A U-shaped slot 78 is sized to receive a round shaft 79, to be hereinafter more fully described. The lower portion of this slot 78 is rounded to receive this round shaft. There is no foreportion of the axle as in FIG. 1 and there is no small diameter portion 50 of the collar 46 as described in connection with FIG. 1. In the collar 146 is formed an opening 148 sized to pass the shaft 79. At the front portion of the collar the opening is continued as U-slot 150. When the shaft 70 is rotated in relation to the collar 146, the slot 150 traps and retains shaft 79. Carried in this collar member 146 as in the description of FIGS. 1, 3 and 5, is the spring detent 52 carried in the threaded aperture 54. Also formed in this collar member is a cam slot 56 having a forwardly directed cam portion 58 at each end of the slot. Whereas in FIG. 1 in the spindle 32 there is mounted only a pin portion 44 which is carried in an appropriately formed hole in the bottom of the U-shaped slot, there is also carried in this round shaft receiving slot 78 a key member 81. This key is a snug fit into a keyway 82 formed in the bottom of the slot 78. This key 81 may be secured in the keyway 82 by welding, by a screw, by a tight drive fit or by any combination thereof. Once secured in place it is anticipated that this key will be fixedly retained in the spindle 70.

Figure 14:
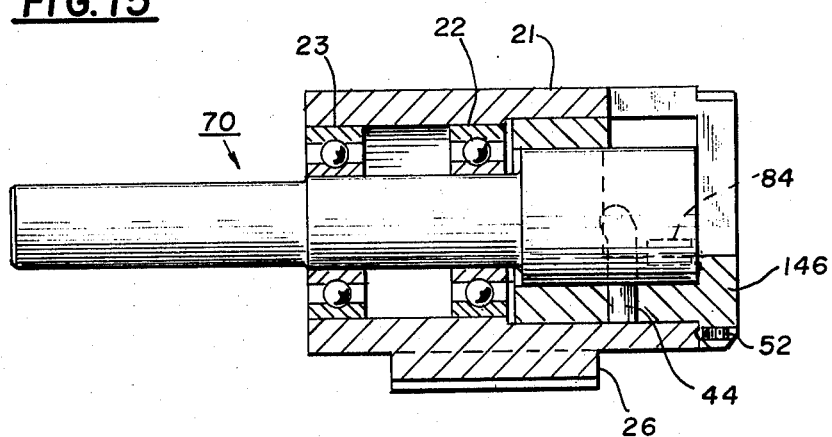
FIG. 14 shows a side view of the drive coupling with a drive portion on the spindle and with the receiver configured for a round shaft as assembled from the components of FIG. 11.

In the manner of the automatic closing coupling of FIG. 1 the round shaft 79 which is to be carried in the coupling is a sliding or drop fit in the U-shaped round opening 78 of the shaft. This shaft 79 has a keyway 84 formed therein which snugly engages this key 81 when it is placed into the U-shaped opening in the spindle 70. As seen in FIGS. 7, 8 and 14, above-described, the square shaft 29 or the round shaft 79 when rotated automatically closes the coupling by either a clockwise or a counterclockwise rotation. When the round shaft 79 is placed in the coupling, the keyway in the round shaft fits onto the upwardly extending key portion 81. This permits the shaft to be smooth and absent projections for the mounting of this shaft in the ends of the rolls. Retention of the ends of the round shaft 79 in either a driven or the drive coupling may be and is preferably by means of the key which fits into a blind keyway 84 in the shaft. If desired, for use in a free turning coupling the round shaft may have an undercut, as seen in FIG. 17.

Figure 17:
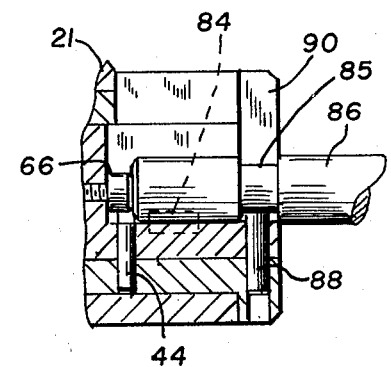
FIG. 17 represents a sectional view, partly diagrammatic and fragmentary taken on the line 17—17 of FIG. 16 and with an undercut in the shaft.

In FIG. 17 a groove or undercut 85 in newly identified shaft 86 is accommodated by pins 88 carried in a collar member 90. Except for having a keyway 82, a key 81 and a spindle 92 used in the follower end, the coupling is like the coupling in FIG. 10, however, it is for a round shaft.

Figure 18:
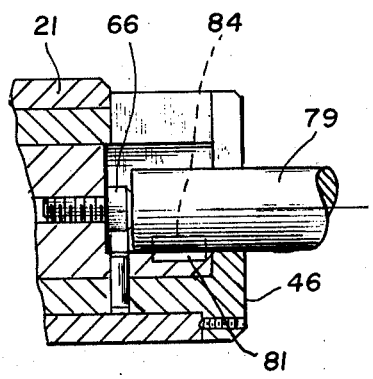
FIG. 18 represents the sectional view of FIG. 16 but with the round shaft having no undercut, this view taken on the line 18—18 of FIG. 16 and looking in the direction of the arrows.
Figure 16:
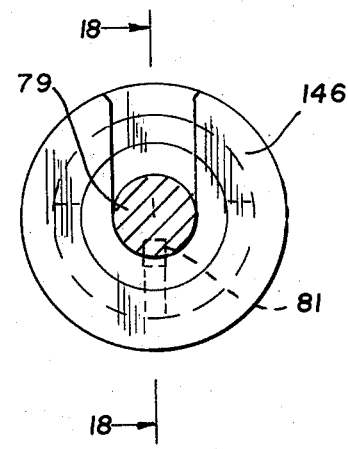
FIG. 16 represents a diagrammatic end view showing the round shaft positioned in the follower coupling.

In FIG. 18 there is shown a follower spindle in which the shaft 79 has no groove and is prevented from axial movement by means of blind keyways 84 formed in each end of the shaft. These blind keyways engage at their ends the keys 81 fastened in each spindle. These keys as they engage and seat in the keyways in the round shaft prevent axial movement of this shaft in the coupling. This permits the coupling to be carried on a slide to align the roll.

It is, of course, understood that the preferred embodiments of the couplings, both driven and free turning for both square and round shafts, may be modified and will need to be modified for particular winding and pay-off installations. Whether an undercut and groove is to be made in the shaft is merely a matter of preference since the groove is merely for the retention of the shaft. If the couplings are securely fastened in plce and there is little variation in the lengths of the shafts on which the rolls are mounted, then precautions may not be required. The adjusting screw, shown in FIG. 10, may be used with any and all couplings, if desired.

The spring detent 52 shown is merely one method of inhibiting the free turning of the coupling until the pin 44 reaches the cam end 58 to cause the coupling to move forwardly into a free turning condition. The detent can be and has been placed on the side of the collar member in frictional engagement with the pedestal. Whether the axle of spindle is extended for the mounting thereon of a gear, sprocket or other driving means, or is cut off or left extended and undriven, is merely a matter of choice. The bearings used in the coupling may be ball, roller, tapered or oil filled, porous metal depending on the environment.

The essential novelty provided by the coupling of this invention is the automatic self-closing feature. The coupling after closing must be manipulated to be opened for removal of the shaft and as contemplated this removal can only be accomplished with a vertical lift. No accidental dislodgement of the shaft can occur in the coupling as now presented and accidental potential has been reduced to near minimum at least as to human error and/or carelessness. Whether the cam slot 56 has camming ends 58 on each of the ends of the slot is a matter of use but it is believed desirable to make the coupling self-closing in either direction as shown and described.

It is to be noted that the cam track and follower need not be as shown but, if desired a cam track may be formed on the extending portion of the spindle. This track would be a shallow groove formed in the exterior surface of the shaft extension. A ball carried by the collar and spring loaded into place engages the groove and a desired forward displacement of the collar is accomplished by the formation of the end or ends of the cam track. Other configurations and arrangements to achieve the same results are possible but as long as a one-fourth revolution is achieved before the restrictive action by the detent is overcome the collar is self closing when the shaft is rotated in the coupling. For example, the cam track instead of being normal to the axis of the spindle may be angled rearwardly and instead of a contoured end at the end of the track a protruding dimple may be provided in the housing and the dentent will engage this dimple until the shaft is to be removed from the coupling. Manipulation will be required to remove the shaft from the automatically closed coupling as in the embodiment shown.

The access opening in the coupling is made to slidably pass the shaft no matter the configuration. As a practical matter this usually occupies about one-quarter of the diameter with the remaining circular opening a sliding and rotating fit on the small front diameter of the spindle. The concept of the coupling turning about one-quarter turn to bring a solid part of the collar in way of the U-shaped access opening in the spindle and trapping the shaft mounted therein provides the closing means automatically provided by the coupling of this invention.

This coupling is as useful on reels or spools for wire and the like as it is for rolls of sheet material. Where and when a shaft for a removable wind or unwind mechanism is required, the automatic coupling of this invention is desirable and useful.

Terms such as "left", "right", "up", "down", "bottom", "top", "front", "back", "in", "out", "clockwise", "counterclockwise" and the like are applicable to the embodiments shown and described in conjunction with the drawing. These terms are merely for the purposes of description and do not necessarily apply to the position in which the automatically closed couplings may be constructed or used.

While particular embodiments of these couplings for square and round roll shafts have been shown and described it is to be understood modifications may be made within the scope of the accompanying claims and protection is sought to the broadest extent the prior art allows.

What is claimed is:

1. An automatically closed coupling for shafts on which are carried reels, spools, rolls and the like, each end of the shaft having a driving means, said coupling including: (a) a pedestal having a housing portion and means for fixedly securing to a support; (b) antifriction bearing means carried in said pedestal housing; (c) a spindle carried in said bearing means so as to be free turning therein, said spindle further secured for axial retention in the pedestal housing, the spindle having at least one extending end portion; (d) an extension portion formed on one end of the pedestal housing and enclosing at least a portion of the extending end portion of the spindle; (e) an access opening formed in the extension portion of the housing, this access opening sized to pass therethrough the end of the shaft to be mounted in the coupling; (f) a U-shaped receiver and opening formed in the extending end of the spindle, this U-shaped opening sized to slidably receive and retain the end of the shaft to be carried in the coupling; (g) cooperative means provided in the U-shaped opening in the spindle and on the end of the shaft to insure that the shaft end when mounted in the U-shaped opening is prevented from relative rotative motion of the shaft and spindle; (h) a collar member slidably carried on the extending portion of the spindle, this collar member both rotatable and axially movable on and over the extending portion of the spindle, the collar member having an access opening through one side thereof, said opening when aligned with the U-shaped opening in the shaft and the access opening in the housing providing a passageway through which is passed the end of the shaft for mounting and carrying in the U-shaped opening in the spindle, the access opening in the coupling occupying no more than about one-quarter of the coupling diameter at the point where it is adjacent the U-shaped receiver opening in the spindle; (i) a cam track and cam track actuating member interactively and cooperatively carried by and formed on the extending portion of the spindle and collar member and adapted to permit relative rotational displacement of about a quarter revolution between the spindle and collar from the position whereat the U-shaped receiver opening in the spindle and the access opening in the collar are in alignment, and at this quarter revolution displacement the cam track is constructed so as to engage the actuating member to move the collar axially a short distance along the shaft extension, and (j) restriction means cooperatively carried by the collar and pedestal housing to inhibit turning of the collar in relation to the pedestal until the cam track engaging member engages the end of the track to cause axial movement sufficient to disengage the restriction means allowing free turning of the spindle in the bearings whereby when a shaft is passed through the aligned openings in the pedestal housing, the collar member and the U-shaped receiver opening in the spindle are seated in the U-shaped opening and about a quarter revolution of the shaft is made, the spindle turns with the shaft a like amount whereby the coupling which has not yet turned because of the restrictive means has a portion of the coupling brought in way of the U-shaped opening in the spindle to trap and retain the shaft end in the coupling as and until the coupling is manipulated to align the several access openings for removal of the shaft.

2. An automatically closed coupling as in claim 1 in which the cooperative means between the U-shaped opening in the spindle and the end of the shaft to prevent relative rotation is a square end on the end of the shaft and a U-shaped opening configured to receive and retain said square end of the shaft so as to substantially position the shaft in an axial coincidence with the axis of the spindle as it is rotated.

3. An automatically closed coupling as in claim 1 in which the cooperative means between the U-shaped opening in the spindle and the end of the shaft is that the end of the shaft is round and the U-shaped receiver opening in the spindle has a semicircular configuration on its closed end and the means to prevent relative rotation is a key carried partially in a keyway in the end of the shaft and a keyway formed in the semicircular bottom of the U-shaped receiver opening in the spindle.

4. An automatically closed coupling as in claim 3 in which the key is secured in the keyway in the U-shaped opening in the spindle and the key is of a length which fits and retains the shafts in axial position by appropriately formed blind keyways in the ends of the shaft.

5. An automatically closed coupling as in claim 1 in which the coupling is a non-powered coupling and the collar has a pair of substantially opposed pins carried therein, the ends of the pins entering the space normally occupied by the end of the shaft mounted in the coupling, the shafts to be mounted in this coupling having a circular groove formed therein, this groove cooperating with the ends of the pins to engage these ends and establish and maintain the axial positioning of the end of the shaft in the coupling.

6. An automatically closed coupling as in claim 1 in which the extension portion of the housing encloses that periphery of the spindle portion having the U-shaped opening except for the access opening which is disposed to be at the top of the housing when the coupling is in mounted condition.

7. An automatically closed coupling as in claim 1 in which the foreportion of the spindle is reduced in diameter and the fore-portion of the collar has a like-sized bore which is sized to permit freely rotative and slidable movement of the collar on the spindle, said reduced diameter providing a positive limitation to and for rearward movement of the collar on the spindle.

8. An automatically closed coupling as in claim 7 in which the movement of the collar on the spindle is limited by the cam track and actuating member which includes an arcuate slot formed in the collar, this slot being at least one-quarter of the circular extent of the collar and the actuating member is a pin fixed in the extending portion of the spindle, said pin being slidable in the slot and extending therein to and when and as the pin engages the slot, with the access openings aligned the collar is at its rearward axial position and at the end of a one-quarter revolution relative movement of the spindle and collar, the collar is cammed forwardly sufficiently to remove the inhibiting effect of the restriction means.

9. An automatically closed coupling as in claim 8 in which the cam slot is about one-half the circumference of the collar and forwardly actuating portions are formed on both ends of the cam slot.

10. An automatically closed coupling as in claim 1 in which the spindle has a cap screw adjustably carried in a threaded hole formed in the end of the spindle, the cap screw positioned by turning so that the end of the cap screw will engage the end of the shaft to be mounted in the coupling to maintain the received shaft in the desired axial position in the coupling.

11. An automatically closed coupling as in claim 1 in which the cooperative means for inhibiting the free turning of the collar is a spring detent carried in and by the collar and with the end of the detent engaging a dimpled recess in the housing to provide the inhibiting means until the collar is moved axially sufficiently to move the detent end from seating engagement with the dimpled recess.

12. An automatically closed coupling as in claim 11 in which the dimpled recess is so formed in the housing that a positive seating engagement by the spring detent occurs only when the collar access opening is in a vertically oriented position.

* * * * *